United States Patent [19]

Franaszek et al.

[11] Patent Number: 5,495,475
[45] Date of Patent: Feb. 27, 1996

[54] RESOLUTION OF RACE CONDITIONS IN CASCADED SWITCHES

[75] Inventors: Peter A. Franaszek, Mt. Kisco, N.Y.; Martin W. Sachs, Westport, Conn.

[73] Assignee: International Business Machines Corporation, Armonk, N.Y.

[21] Appl. No.: 394,934

[22] Filed: Feb. 27, 1995

Related U.S. Application Data

[63] Continuation of Ser. No. 137,859, Oct. 15, 1993, abandoned.

[51] Int. Cl.⁶ .................................................. H04J 3/02
[52] U.S. Cl. .................................................. 370/54; 370/60
[58] Field of Search .................................. 370/54, 60, 60.1, 370/94.1, 58.1, 58.2, 58.3, 93, 92, 85.6, 85.2, 16, 94.3, 16.1, 24, 26, 29; 340/825.03, 826, 827, 825.5, 825.15

[56] References Cited

U.S. PATENT DOCUMENTS

| | | |
|---|---|---|
| 4,853,927 | 8/1989 | Wenzel ........................... 370/16 |
| 4,956,841 | 9/1991 | Judeinstein et al. ............ 370/94.1 |
| 5,008,880 | 4/1991 | Azuma .............................. 370/85.6 |
| 5,088,091 | 2/1992 | Schroeder et al. ................ 370/60 |
| 5,105,424 | 4/1992 | Flaig et al ...................... 370/94.1 |
| 5,107,489 | 4/1992 | Brown et al. .................... 370/58.2 |
| 5,111,198 | 5/1992 | Kuszmaul ........................ 370/94.1 |
| 5,115,433 | 5/1992 | Baran et al. .................... 370/94.3 |
| 5,117,420 | 5/1992 | Hillis et al. ..................... 370/60 |
| 5,138,615 | 8/1992 | Lamport et al. ................... 370/60 |

Primary Examiner—Melvin Marcelo
Assistant Examiner—Huy D. Vu
Attorney, Agent, or Firm—Douglas W. Cameron

[57] ABSTRACT

A method for resolving race conditions in cascaded switches. More specifically, cross links between the cascaded switches are assigned preferred directions relative to each of the switches. A connection request or a response emanating from a switch will always use a send preference cross link if such link is available.

11 Claims, 5 Drawing Sheets

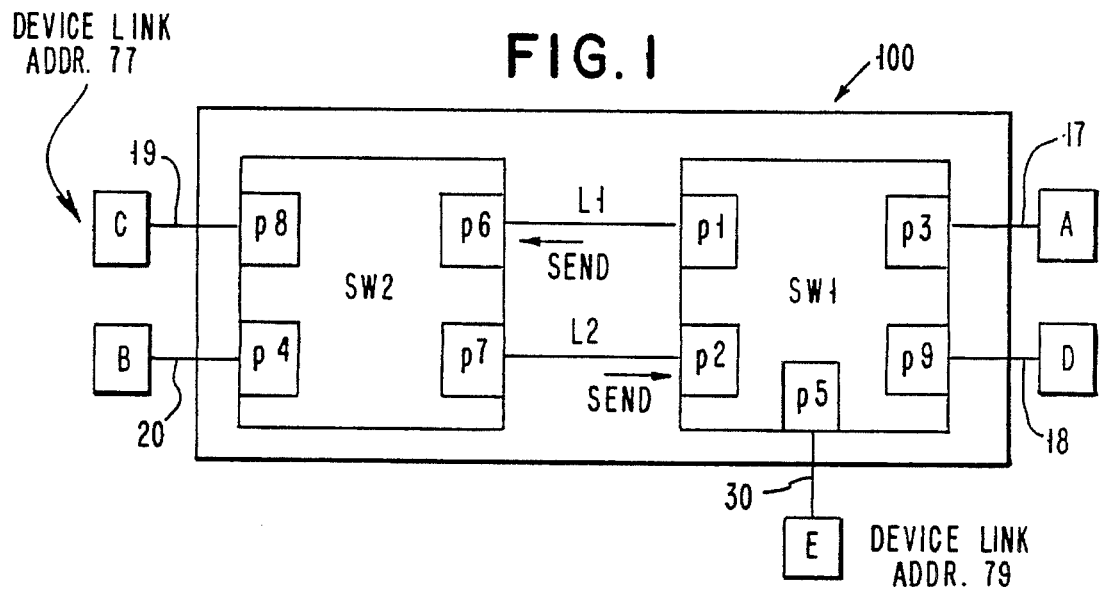
FIG. 1
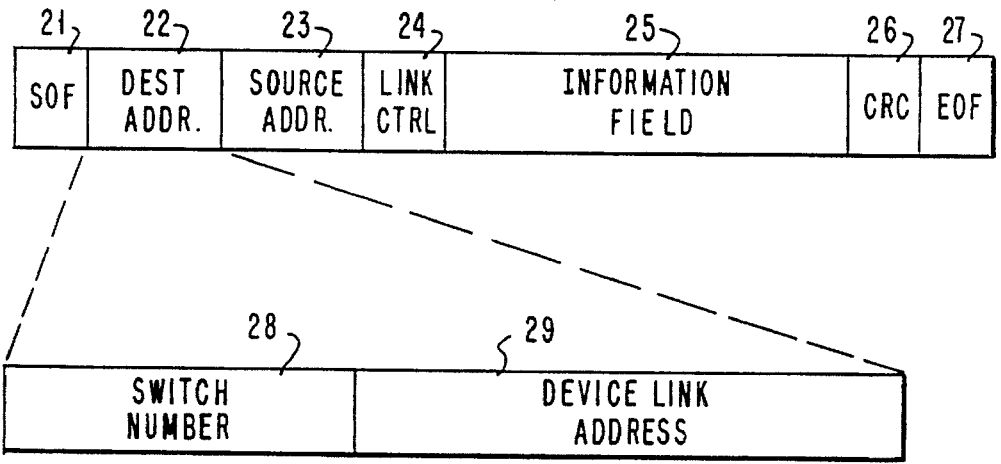
FIG. 2
FIG. 3A
FIG. 3B
FIG. 3C

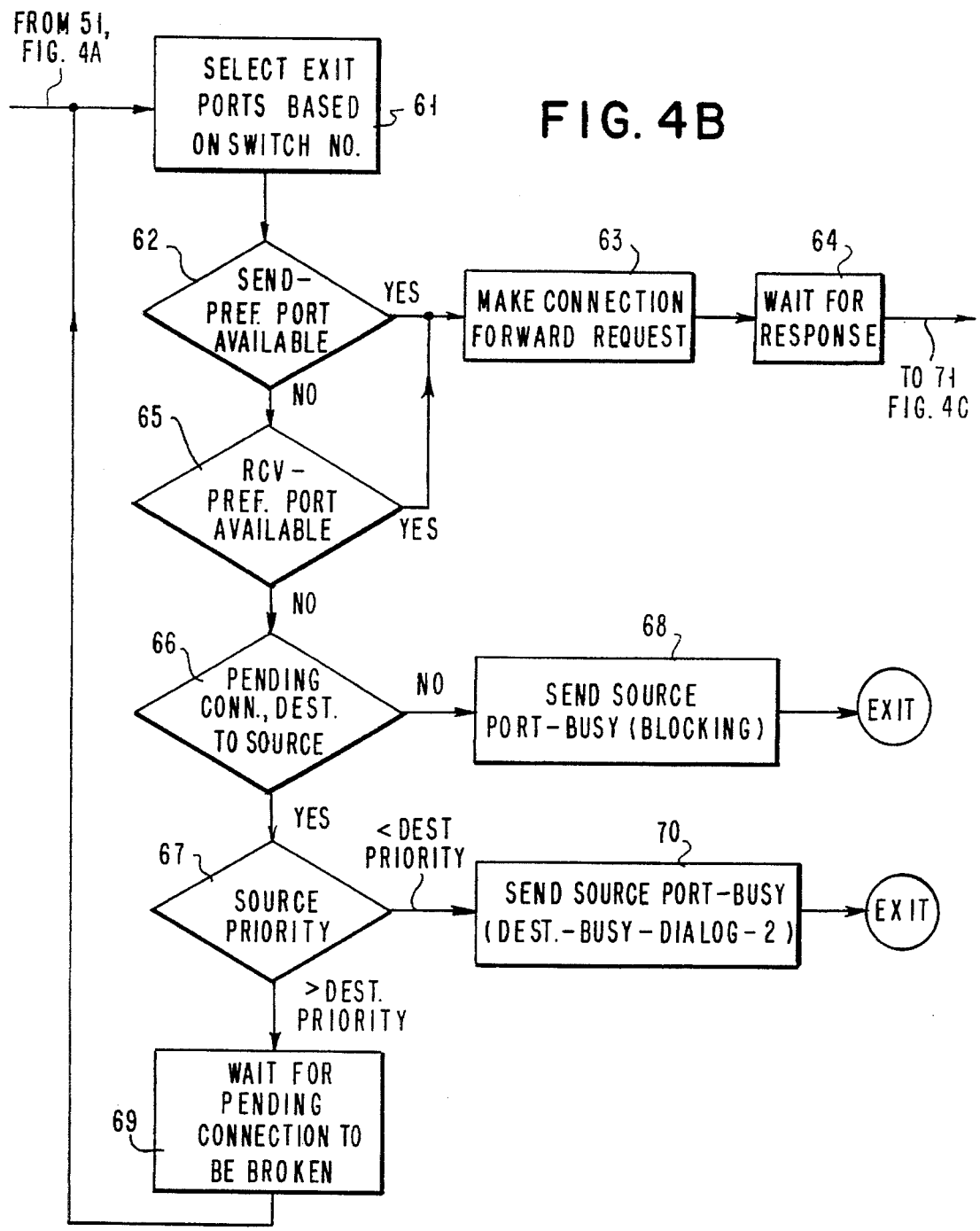

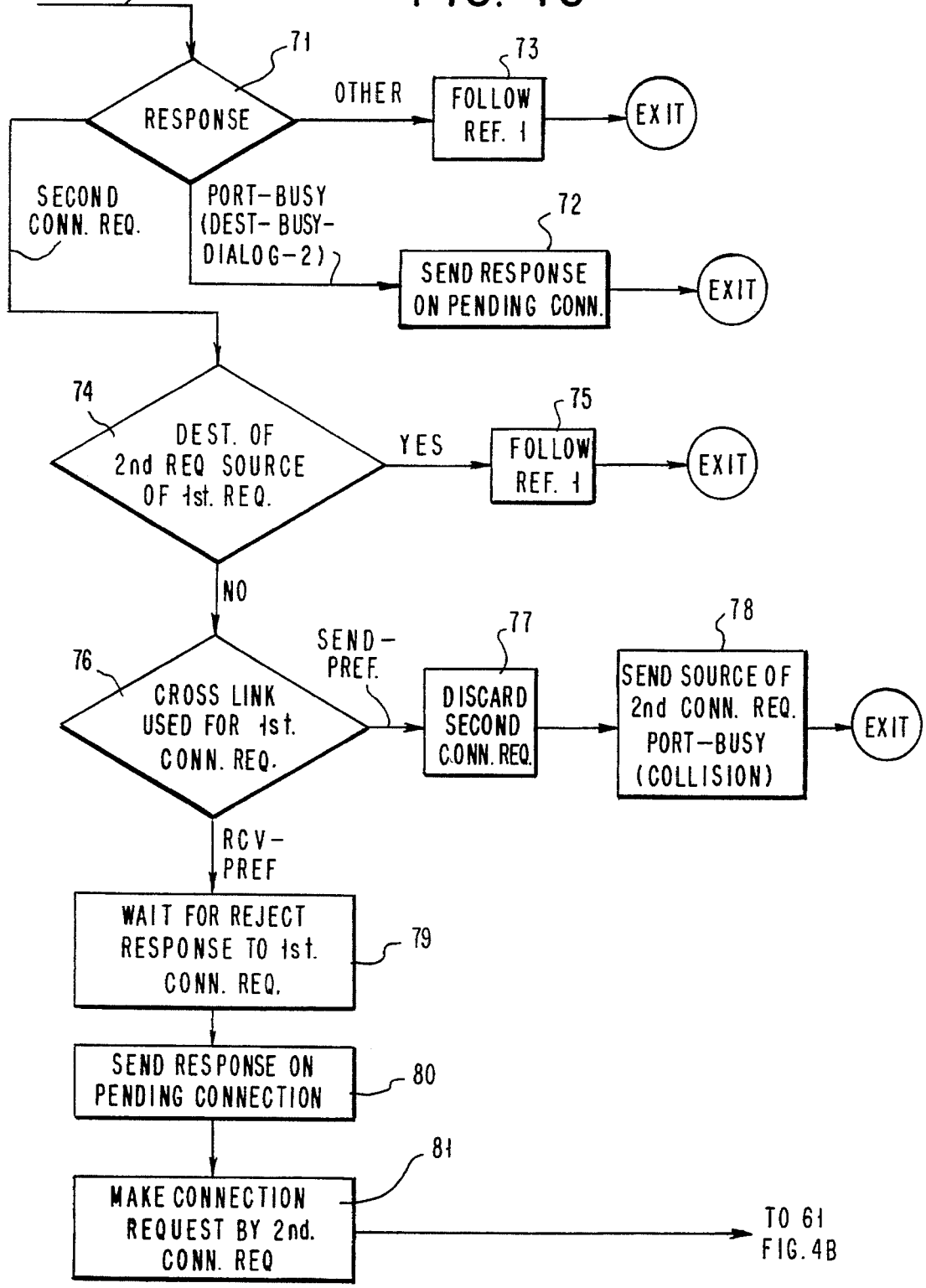

RESOLUTION OF RACE CONDITIONS IN CASCADED SWITCHES

This is a continuation of application Ser. No. 08/137,859, filed Oct. 15, 1993 abandoned.

TECHNICAL FIELD

This invention relates to handling of connections through cascaded switches. More specifically, this invention provides for the resolution of race conditions in the cascaded switches.

DESCRIPTION OF THE PRIOR ART

A switch fabric often consists of a set-of crossbar switches, where each switch has its own connection control, independent of other switches in the fabric. Adjacent crossbars are attached to each other by one or more links (hereinafter referred to as cross links) which are preferably full duplex. In general, more than one cross link is provided between adjacent switches in order to reduce blocking in the fabric. A set of devices (e.g. processors or I/O control units) are attached to the fabric by full duplex links. The fabric provides end to end full duplex connections between devices, over which multiple messages may be transmitted in either direction between the two devices. A device explicitly request a connection to another device. At a later time, one of the two connected devices explicitly requests that the connection be removed or broken.

A connection is established by sending a request packet which includes a control header. The packet travels the path which will comprise the end to end connection. At each switch, a decision is made regarding whether (a) the connection to the next switch should be granted, (b) the request should be denied, or (c) the request should be delayed.

If a request is denied, a reject message is sent back along the path to the requesting device to try again. As the reject message traverses the reverse path, the partially established path is removed. If a request is delayed, this ties up resources which might be granted to others. Retries are potentially expensive and might lead to livelock situations where repeated retries by a set of devices interfere with each other.

Unlike many switch fabrics, a given cross link interconnecting two switches in this fabric can at any time be used in either direction (this minimizes controller interaction). The result is that there are potential conflicts between requests going in opposite directions. When two requests are sent on the same cross link in opposite directions, they may be compatible or incompatible. The two requests are compatible if both request a connection between the same two devices. Otherwise, they are incompatible. In some .cases, adjacent switches may attempt to satisfy incompatible requests using the same cross link. In other cases, requests are denied because they were assigned to different cross links between the same two switches when these requests could have been granted if these requests were assigned to the same cross link. Such situations can lead to repeated denial of requests and retries.

IBM Technical Disclosure Bulletin, Vol. 33, No. 10B, pp. 457–8, March 1991, discloses a method of coupling two circuit switches together using a single cross link. One switch is designated high priority, and the other is designated low priority. In a collision between the two connection requests, the connection request frame received at the high priority switch is discarded, and the other connection is allowed. The IBM Technical Disclosure Bulletin article, however, does not teach nor suggest use of multiple cross links between two switches where different cross links have different directional priorities or preferences. Further, the method of this disclosure is extremely unfair since the same switch always wins in a conflict.

European Patent, publication number 0 233 993 B1 to Neches teaches the establishment of priority between colliding packets by comparing addresses in the packets. This patent relates to a network which is a tree structure of broadcast nodes which has no explicit routing function. It is unrelated to a fabric of crossbar switches interconnected by full duplex links.

U.S. Pat. No. 5,107,489 to Brown et al discloses a dynamic switch whose operating state is dependent on the direction of frames transmitted through the switch. This patent also teaches establishing a priority relationship between two initiation frames based upon the value of the source end-point address of each frame. Switches designed according to this patent cannot be interconnected to form a fabric because this patent does not teach how to avoid the livelock situations mentioned above.

U.S. Pat. No. 4,956,841 to Judeinstein et al discloses the transmission of packets using arrows and instructions therein. Upon arrival at a node, instruction following the arrow which enable the packet to arrive at the nodes designating where a packet is to be transmitted. While information in the packet determines the routing of the packet there is no suggestion in this patent about assigning directional preferences to links.

U.S. Pat. No. 5,105,424 to Flaig et al discloses the routing of a packet according to routing directions contained in the header of the packet.

U.S. Pat. No. 5,115,433 to Baran et al discloses routing packets according to proselected criteria so as to use the least amount of power.

U.S. Pat. No. 4,853,927 to Wenzel discloses decentralized controlled transmission rerouting where there are faulty operating paths. A restoration link in relevant direction of transmission is determined and switched to immediately without message transmission between monitoring devices which detect faults in the operating paths.

U.S. Pat. No. 5,008,880 to Azuma discloses a data transmission apparatus where priorities are assigned to data transmission paths. When any data transmission paths of a plurality of first transmission paths simultaneously receive data, data in a data transmission path having the higher priority is transmitted to a second transmission path. There are, however, no directional preferences assigned to the same link.

U.S. Pat. No. 5,117,420 to Hillis et al discloses a method of routing messages wherein the status of latches determines the routing path of message packets in a forward direction, and wherein this same information in the latches can be used to route the message packets in a reverse direction.

U.S. Pat. No. 5,111,198 to Kuszmaul discloses a tacthod of transmitting packets in a communications network wherein one of two messages will be transmitted towards the destination while the other of the messages will be transmitted to an auxiliary node.

There is therefore a need for efficiently handling the granting of connection requests through a switching fabric.

SUMMARY OF THE INVENTION

It is accordingly the objective of this invention to provide means for efficiently controlling the granting and denial of connection requests through a switching fabric. More particularly, it is an object that when the fabric attempts to assign paths to two incompatible requests, the requests are, at every switch, satisfied by two different cross links. It is another object that when the fabric attempts to assign paths to two compatible requests, both requests are assigned to the same cross link between the same two switches.

With this invention directional preferences are assigned to each of the cross links interconnecting the switches of fabric. More specifically, a given cross link will for example be assigned a send preference as opposed to a receive preference. Connection request packets from a first switch to a device attached to a second switch will be assigned or routed through the first switch's send preference links if such links are available. In explaining the invention, we may either describe a cross link as having a directional preference with respect to a given switch, or we may describe a port to which a cross link is attached as having a directional preference. For example, in FIG. 1, for link L1, the preferential direction is from p1 of SW1 to p6 of SW2; for link L2, the preferential direction is from p7 of SW2 to p2 of SW1.

This invention provides an efficient protocol for handling connection requests by following the following three principles:

1. Requests from adjacent switches to each other, involving different pairs of source and destination devices are assigned to different cross links where two cross links with different directional preferences are available between the two switches.
2. When only one cross link is available between adjacent switches, and two connection requests involving different pairs of source and destination device are in conflict, the request which violates the directional preference of the cross link is rejected.
3. When two conflicting requests involving the same source and destination devices are assigned to different cross links between the same two switches, one such request is initially rejected and then may be re-sent after the accepted request causes the connection to be made.

As noted earlier, in a fabric consisting of interconnected switches, conflicts are possible between requests issued at approximately the same time which may lead to livelock. For example, referring to FIG. 1, the following are examples of possible conflicting requests:

In one conflict, devices on different switches simultaneously attempt to connect to each other. For example, devices A and B, in FIG. 1, might simultaneously attempt to connect to each other. Without the invention disclosed herein, the two connection requests could be assigned to different cross links, and each device's connection request would then be rejected with a destination-busy condition since each request blocks the path of the other. Further, the result could be a never-ending sequence of rejects and retries. This invention causes the two requests to be satisfied with the same cross link when they are compatible with each other.

In another conflict, devices on different switches request connections at the same time, though not to each other. For example, device A might attempt to connect to B at the same time that device C is attempting to connect to device D in FIG. 1. Without this invention, switches SW1 and SW2 might attempt to use the same cross link. As a result, both connection requests could be rejected with a destination-busy condition, possibly leading to a never-ending sequence of busy-retries. This invention provides means to cause the two requests to be satisfied by different cross links if more than one cross link is available, or to cause one request to be satisfied and the other rejected if only one cross link is available or, in some cases, if all the available cross links have the same directional preference.

Each switch establishes connections based on information in connection request packets similar to the connection request frames described in Reference 1, illustrated in FIG. 2 which will be explained below. Each switch establishes connections based only on information local to itself; there is no communication among switches in establishing a connection which traverses more than one switch. The connection request is simply Forwarded by each switch, via a cross link, to the neighboring switch.

BRIEF DESCRIPTION OF THE DRAWINGS

FIG. 1 is an illustration of several devices interconnected by a fabric having two switches.

FIG. 2 is an illustration of a message packet.

FIG. 3 is an illustration of the division of a source or destination address :into a switch number and a device link address.

DESCRIPTION OF THE PREFERRED EMBODIMENT

Figure 4A:
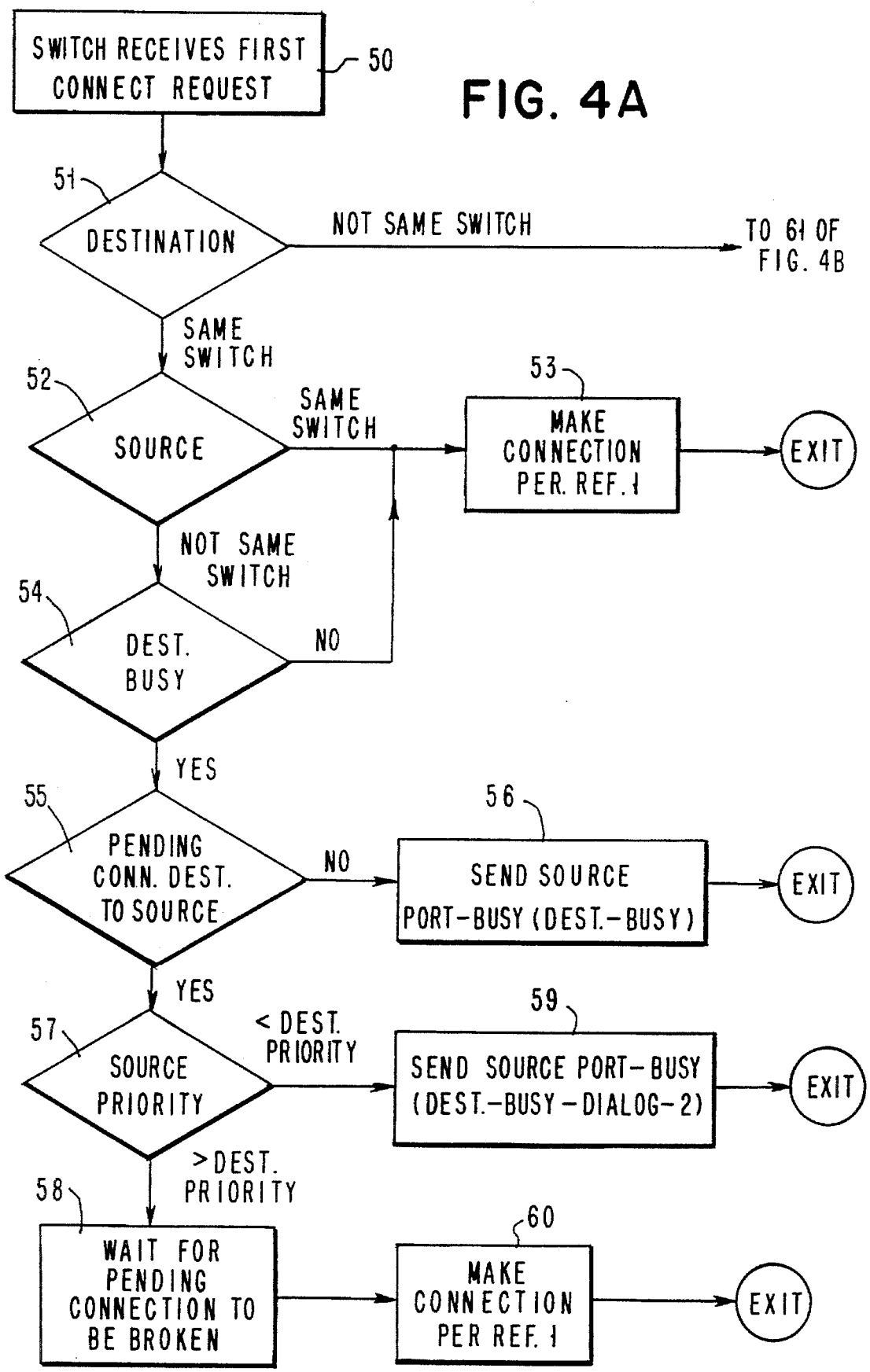
FIG. 4 is a flow chart of the connection algorithm.

FIG. 1 illustrates the input/output (I/O) subsystem of a data processing system. A set of devices A, B, C, and D (e.g. processors or I/O control units) are interconnected by a fabric 100 consisting of a set of cross bar switches SW1 and SW2. The cross links L1 and L2 between switches and the links 17, 18, 19, 20, and 30 between switch ports p3, p9, p8, p4 and p5 and devices A, D, C, B, and E, respectively are full duplex links. The crossbar switches may be similar to that disclosed in Reference 1; however, the latter switches cannot be interconnected to form a fabric. Cross link L1 is attached to port p1 on switch SW1 and to port p6 on switch SW2. Cross link L2 is similarly attached to port p2 on switch SW1 and to port p7 on switch SW2. Devices C and E are also shown as having device link addresses 77 and 79, respectively, whose purpose will be explained below. Only two cross links are shown for the purposes of illustration. Many more cross links could be used. It will also be understood that a data processing system may have a much larger number of switches and devices than illustrated here. Further, a particular device may have a plurality of links, each attached to a different port on the same or different switches.

In order for devices A and C, for example, to communicate, a circuit connection must be established from A through SW1 through one of the cross links and then through SW2 to C.

As taught in Reference 1 for a single switch, each device is identified by a link address which is unique among all devices attached to the fabric. To cause a connection to be made to a particular device, a device sends a connection request packet which contains the address of the desired device and other information which instructs the switch to make a connection.

The connection request packet is a particular form of the message packet, which is illustrated in FIG. 2. As taught in reference 1, the message packet is composed of a start of frame delimiter 21, destination address field 22, source address field 23, link control field 24, information field 25, CRC field 26, and end of frame delimiter 27. The start of frame delimiter 21 identifies the start of the packet. One kind of start of frame delimiter signals a receiving switch that a connection is requested. Another kind of start of frame delimiter signals a receiving switch that the packet is to be sent on the existing connection. Other kinds of start of frame delimiter are explained in reference 1. The destination address field 22 identifies the device to which the packet is being sent; for a connection request packet, the device is the device to which the sender of the packet (source device) desires a connection. The source address field 23 identifies the device which sent said packet. The link control field 24; among other things, defines the type of packet, as for example a connection request packet or a reject message packet. The link control field also performs other Functions, which are not relevant to this invention, as taught in reference 1. The information field 25 contains any information desired, depending on the type of packet. The CRC field 26 provides an error check on the packet. The end of frame delimiter 27 indicates the end of the frame. One kind of end of frame delimiter causes the connection to be broken after the packet passes through, as is used in the reject message packet. Another kind of end of frame delimiter causes the connection to be retained after the packet passes through the switch, as is used in the connection request packet. Other kinds of end of frame delimiter are explained in reference 1.

Matrix controller means (such as taught in ref. 2) in the switch determines the switch port to which the destination device is attached and whether that port is available for a connection (A connection to the destination may already exist, or the destination port may be unavailable due to a failure or other condition.) If the matrix controller determines that a connection can be made, it makes the connection, and the switch sends the connection request packet to the destination.

In a fabric containing more than one switch, multiple routes between two devices are possible. Such routes may traverse either the same or different sets of switches. For example, in FIG. 1, the path between devices D and C may go through either cross link L1 or cross link L2. In general, in such a fabric, more than one port at a given switch may provide a path to the same destination. The switch of reference 1 includes matrix controller means for selecting an outgoing port to which the device with the desired destination address is attached. In a fabric of multiple switches in which multiple routes are possible, the address translation means of the matrix controller is extended to select a set possible outgoing ports for a given destination and then to select one port out of this set, as will be explained below.

The switch includes means for reducing the likelihood of two conflicting requests being assigned, by adjacent switches, to the same cross link. Every cross link in the fabric prefers request messages in one direction to request messages in the other direction. At an individual switch, every cross link is designated either send-preference or receive-preference. A given cross link is send-preference for one switch and receive-preference for the other switch. For example, in FIG. 1, cross link L1 might be send-preference for switch SW1 and receive-preference for switch SW2. Whether a cross link is send-preference or receive-preference is recorded in the information about each port which is used by the matrix controller to select a port. For example, the send or receive preference may be recorded in a bit in a port status table entry, as will be explained below.

The distribution of send-preference and receive-preference ports at a given switch and throughout a particular fabric is dependent on the workload of the particular fabric. In general, between any two given switches some cross links should be send preference for one switch, and some should be send preference for the other switch. The assignment of send and receive preferences to cross links can be performed by a system administrator or by a computer program, either arbitrarily or based on the known traffic distribution, (i.e. the rate of connection requests passing in each direction between the switches in each pair). Once the assignments have been determined, they may be entered into the switches by any means known in the art. For example, a maintenance processor, such as the switch control unit in reference 1, may be used to enter this information along with other configuration information.

In the preferred embodiment, each switch treats the destination link address in the connection request packet as composed of a switch number and a device link address, as illustrated in FIG. 3.1. The switch number 28 identifies the switch to which the destination device is connected. The device link address 29 identifies the destination device. Each switch is assigned a unique switch number value, and all devices attached directly to a particular switch have the same switch number value as part of their link addresses. All the devices attached to ports on a particular switch have unique values of the device link address. However two devices attached to ports oil different switches may have the same value of the device link address since the devices are distinguished by the combination of switch number and device link address. Assignment of unique switch number values may be performed by either a configuration management program or by a system administrator. The switch number values may be provided to the switches by any means known in the art, such as through a maintenance processor attached to the switches.

When a first switch receives a connection request packet, it first checks the switch number in the packet. If the switch number in the packet is the same as the switch's switch number, it means that the destination device is attached to a port on the switch. The switch therefore makes the connection according to the device link address in the connection request packet, as taught in references 1 and 2, and thus, directly to the desired destination. If the switch number in the packet is not the same as the first switch's switch number, then the switch makes the connection according to the switch number in the packet, i.e. to a port which is attached to a cross link that goes to another switch oil the way to the destination device.

It will be understood that any desired number of bits may be used for the switch number and for the device link address.

In order to select an outgoing port based on a given destination switch number, the matrix controller contains address translation means (e.g. table) to translate switch numbers into port numbers. The translation information for a given switch number identifies each port which is attached to a cross link that is in turn attached either to the switch which is identified by the particular destination switch number or to a switch which is oil a path to that switch number. The translation information also includes a port status table which contains, for each port, status information such as whether the port is send or receive preference (directional preference bit), whether it is available to accept a new connection (connection status bit), and whether it is operational (operational status bit).

Figures 5, 6:
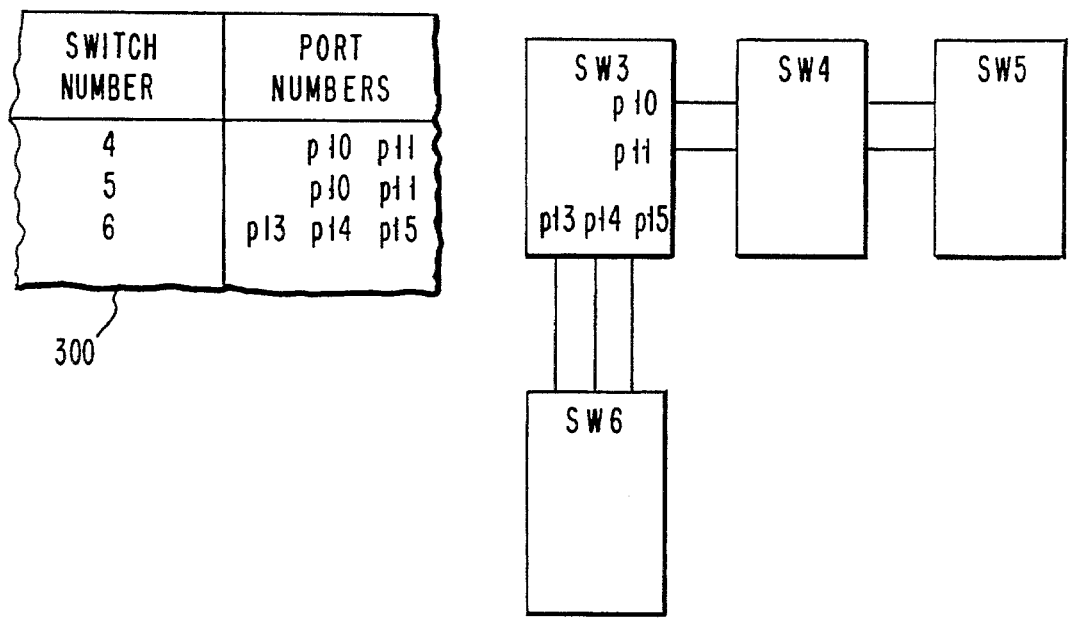
FIG. 5 is a graphic illustration of the Switch Number to Port Number Translation Table.
FIG. 6 is a graphic illustration of the Port Status Table.

FIG. 5 and FIG. 6 illustrate this process. FIG. 5 shows a switch number to port number translation table and the fabric to which the example applies. The fabric consists of Four interconnected switches, SW3, SW4, SW5, and SW6. SW3 is attached to five cross links. Ports p10 and p11 in SW3 are attached to cross links which are in turn attached to SW4. Ports p13, p14, and p15 in SW3 are attached to cross links which are attached to SW6. SW4 is attached to two additional cross links which are in turn attached to SW5. The translation table 300 in SW3 is shown in FIG. 5. It contains an entry for each of the other switches (SW4, SW5, and SW6). The entry for a particular switch is a set of port numbers of ports attached to cross links through which packets can be sent to the particular switch. As illustrated in the table in FIG. 5, SW3 can use ports p10 and p11 to send packets to SW4. It can also use the same ports to send packets to SW5; such packets are sent via SW4. SW3 can use 5ports p13, p14, and p15 to send packets to SW6. It will be understood that SW4, SW5, and SW6 contain similar tables.

FIG. 6 illustrates part of the port status table 400 of switch SW3 in FIG. 5 and includes the definitions of the three status bits in the table. In this example, p13 and p15 are send-preference, port p14 is receive-preference. The preferential direction would be a transmission from p13 and p15 to ports of SW6. Ports p13 and p14 are available for new connections. Port p15 is already connected. Ports p13, p14, and p15 are operational. Port p6 is receive-preference and not connected, but it is not operational and therefore cannot be used to send or receive packets.

When a switch receives a connection request whose destination link address contains a switch number other than its own switch number, the matrix controller in said switch identifies all ports attached to cross links on paths to the switch with the specified destination switch number, using the switch number to port number translation table. It determines, using the connection status bit and the operational status bit in the port status table for each identified port, which of these ports are available to make a new connection. It then determines, using the directional preference bit in the port status table for each identified port that is available, whether each of the available ports is send-preference or receive-preference. If a send-preference port is available, the matrix controller makes the connection to that port. Otherwise, it makes the connection to a receive-preference port. If none of the permissible ports is available, the switch responds to the connection request with a reject indicating port-busy(blocked).

Referring to FIG. 1, an example of the port selection process is as follows. Device A sends a connection request packet to Device C. As illustrated in FIG. 3.2, the destination address in the packet is comprised of a destination switch number whose value is 2 and a destination device link address whose value is 77, the address assigned to device C. SW1 compares the destination switch number (value 2) with its own switch number (value 1). Since the two switch numbers are unequal, the destination device is attached to another switch. The matrix controller in SW1 therefore uses the destination switch number (value 2) in the packet to select a send-preference port, port p1 in this illustration, and makes a connection to that port in order to send the connection request to the next switch SW2 on the path to device C. When the connection request packet arrives at SW2, SW2 compares the destination switch number in the packet to its own switch number. Since the two switch numbers are equal, the matrix controller in SW2 uses the destination device link address (value 77) in the connection packet to identify the port (p8 in this illustration) which is attached to the destination device. The controller in SW2 then makes the connection, and the switch sends the connection request packet to device C.

Referring again to FIG. 1, device D sends a connection request packet to device E. As illustrated in FIG. 3.3, the destination address in the connection request packet is comprised of a destination switch number value of 1 and a destination device link address of 79, representing device E attached to a port on SW1. Since the destination switch number in the connection request packet is equal to the switch number of SW1, the matrix controller in SW1 uses the destination device link address and immediately makes the connection to port p5, and the switch forwards the connection request packet to port p5 and thence to device E.

FIG. 4 illustrates the algorithm each switch uses to make requested connections. As mentioned earlier, each switch acts independently of all other switches, using only information which is local to itself. As a connection request progresses across the fabric, each switch along the path from source device to destination device in turn executes this algorithm.

It will be noted that the algorithm makes use of priorities to resolve conflicts for the case where two devices attempt to connect to each other. For the purpose of this algorithm, use of priorities means that the switch selects one of the two connection requests by comparing information in the two request packets. Any field in the request packet may be used as a priority indicator if the contents of this field always differ between two conflicting packets. For example, the higher priority packet may be the one with the higher value of source address.

The following description of the connection algorithm makes reference to the term "pending connection". As taught in reference 1, a connection is not considered established until the destination device sends an acknowledgment to the source device of the connection request. A pending connection is a physical connection which was created to send the connection request packet to the destination device but no acknowledgment has yet been received from the destination device.

The following description of the connection algorithm makes reference to rejects. A reject message is contained in a packet similar to the message packet shown in FIG. 2. The link control field 24 indicates that said packet contains a reject message, the start of frame delimiter 21 indicates that a new connection is not to be created, and the end of frame delimiter 27 indicates that a connection is to be broken. The information field 25 contains the information describing the reject reason code. The following reject reason codes are mentioned in the switch connection algorithm:

Port-busy(destination-busy): Indicates that the destination device is already connected to some other device.

Port-busy(destination-busy-dialog-2): Indicates that the destination is busy because the destination device had sent a prior connection request to the source of the first connection request.

Port-busy(collision): Indicates that the destination device could not be reached because of a collision with an incompatible connection request from an adjacent switch. This situation occurs when two adjacent switches attempt to forward incompatible connection requests on the same cross link; one of the incompatible connection requests is discarded. An immediate retry may succeed.

Port-busy(blocked): Indicates that the destination device could not be reached because no cross links are available between two adjacent switches on the path.

Referring to FIG. 4.1, at 50, a port on a first switch receives a first connection request packet from its link, which may be attached to a device or may be a cross link to another switch. At 51 and 52, the matrix controller in said first switch inspects the switch numbers in the source and destination addresses of said first connection request packet. If both the source and destination switch numbers are equal to the switch number of said first switch, both source and destination devices are attached to ports in said first switch, and said first switch processes the connection request based on the source and destination device link addresses at 53, as taught in references 1 and 2, after which the algorithm terminates.

Referring back to 52, if the destination switch number is the same as the switch number of said first switch but the source switch number is not the same as the switch number of said first switch, then the source device is attached to a port in a different switch while the destination device is connected to a port in said first switch. In this case, at 54, the matrix controller determines if the destination port is busy (already 5participating in a different connection). If the destination port is not busy, the switch continues to process the connection request at 53 as taught in references 1 and 2, after which the algorithm terminates. If the destination port is busy, said first switch, at 55, checks whether the destination port is busy because there is a pending connection (as a result of a prior connection request) from the device attached to the destination port to the device which sent said first connection request. If not, said first switch sends a reject indicating port-busy(destination-busy) to the device which sent said first connection request, thereby breaking any pending connection created by said first connection request through other switches between said first switch and said source device. The algorithm then terminates.

If there is a pending connection from said destination device to the source device of said first connection request, the switch at 57 then compares the priorities of the source and destination of said first connection request. If the priority of said source device is lower than the priority of said destination device, the switch sends, at 59, a reject indicating port-busy(destination-busy-dialog-2) to said source device, thereby breaking any pending connection created by said first connection request through other switches between said first switch and said source device. The algorithm then terminates.

If, at 57, the priority of the source device of said first connection request is greater than the priority of said destination device, the switch waits, at 58, for the pending connection created by said prior connection request to be broken by a reject message from a different switch which issued the reject at 70 in its own execution of this algorithm, as will be described below. When said pending connection is broken, the switch, at 60, processes said first connection request as taught in references 1 and 2. The algorithm then terminates.

Referring back to 51 in FIG. 4.1, if the destination switch number in said first connection request is not the same as the switch number of said first switch, the destination device of said first connection request is in a different switch. Said first switch then selects a port connected to a cross link on which to forward said first connection request. Referring to FIG. 4.2 at 61, the matrix controller in said first switch determines a set of ports which are connected to cross links on routes to said destination device, by means which were described previously. At 62, said matrix controller determines whether one of said selected ports is a send-preference port which is available for a new connection. If so, said matrix controller at 63 makes a connection from the port on which said first connection request arrived to said selected send-preference port. The switch then forwards said first connection request, at 63, on said connection and attached cross link and waits for a response at 64. When the response arrives, the switch proceeds to 71 as will be described below.

If, at 62, none of the available selected ports is send-preference, said matrix controller determines at 65 if a receive-preference port is available. If a receive preference port is available, the switch then makes a connection from the port on which said first connection request arrived to said selected receive-preference port. The switch then forwards said first connection request, at 63, on said connection and cross link and waits for a response at 64. When the response arrives, the switch proceeds to 71 as will be described below.

If, at 65, none of the selected ports are available, said first switch, at 66, checks whether there is a pending connection, as a result of a prior connection request from the destination device of said first connection request to the source device of said first connection request. If not, the switch., at 68 sends a reject indicating port-busy(blocking) to the source device of said first connection request, and the algorithm terminates.

Referring back to 66, if a there is a pending connection from the destination device of said first connection request to the source device of said first connection request, the switch compares the priorities of the source and destination devices of said first connection request. If the priority of the source device is lower than the priority of the destination device, the switch sends, at 70, a reject indicating port-busy(destination-busy-dialog-2) to the source device of said first connection request, thereby breaking any pending connection created by said first connection request in switches between said first switch and said source device. The algorithm then terminates.

If, at 67, the priority of said source device is greater than the priority of said destination device, the switch waits for said pending connection to be broken by the reject issued by another switch executing the same algorithm at 59, as described above. The switch then returns to 61 and again attempts to select a port suitable for making the connection requested by said first connection request.

As described above, when said first switch successfully makes a connection, at 63, to a port selected at 62 and 65, it waits for a response at 64. At 71, (See FIG. 4.3.) it checks the response. If the response is a reject indicating port-busy(destination-busy-dialog-2), said first switch forwards the response to said source device, thereby breaking the pending connection created by said first connection request through any switches between said source device and said first switch.

If the response at 71 (See FIG. 4.3.) is a second connection request, the switch checks at 74 whether the destination device of said second connection request is the same as the source device of said first connection request. If so, said first switch processes said second connection request at 75 as taught in reference 1. The algorithm then terminates.

If, at 74, the destination device of said second connection request is not the same as the source device of said first connection request, said first switch checks, at 76, the directional preference of said port selected for said first connection request. If said port is a send-preference port, said first switch discards said second connection request at 77 and, at 78, sends a reject indicating port- busy(collision) to the source device of said second connection request, thereby breaking any pending connection created by said second connection request through any switches between the source device of said second connection request and said first switch. The algorithm then terminates.

If, at 76, said port is a receive-preference port, said first switch waits, at 79 for the reject response to said first connection request, created by another switch executing the same algorithm at 78. Said first switch, at 80, sends the received response to the source device of said first connection request, thereby breaking the pending connection created by said first connection request through any switches between said first switch and said source device. At 81, said first switch then attempts to create the connection requested by said second connection request by returning to 61 and proceeding as described above.

If the response at 71 is any other response, such as an acknowledgment or any reject other than those mentioned above, said first switch finishes processing said first connection request, at 73, as taught in reference 1. The algorithm then terminates.

If a device which sent a first connection request packet receives in response a reject message, containing one of the reject reason codes mentioned above, it acts on it as follows: If the reject reason code is port-busy(destination-busy), the device may re-send said first connection request at a later time. If the reject reason code is port-busy(destination-busy-dialog-2), the device waits for a second connection request which was sent to it by the destination device of said first connection request. It may or may not then re-send said first connection request. Either action is in accord with this invention. If the reject reason code is port-busy(collision), the device may or may not re-send said first connection request. Either action is in accord with this invention. If the reject reason code is portbusy(blocking), the device may or may not immediately re-send said first connection request. If it re-sends said first connection request, the preferred embodiment is to re-send the request through a different switch if the device is attached to two or more independent switches. Any of the foregoing actions is in accord with this invention.

REFERENCES

1. U.S. Pat. No. 5,107,489, "Switch and Its Protocol for Making Dynamic Connections", Brown et al, assigned to IBM.
2. U.S. Pat. No. 4,630,045, "Controller for a Cross-Point Switch Matrix", C. J. Georgiou, assigned to IBM.

References 1 and 2 immediately above hereby incorporated herein by reference.

Having thus described our invention, what we claim as new and desire to secure by Letters Patent is:

1. In a switching system having a plurality of dynamic switches interconnected by full duplex cross links, and having a plurality of devices connected to said system, with connections being established by transmitting connection request packets through said system, a method of eliminating livelock, and reducing the occurrence of race conditions created when two of said connection request packets are both concurrently transmitted in different directions through any same cross link, of said cross links, said method comprising:
   a. initially assigning preferred directions to each of said cross links; and
   b. routing each of said connection request packets only in preferred directions of said cross links if preferred directions on said cross links are available.

2. A method as recited in claim 1, wherein each of said switches comprises a table, wherein said table in each of said switches identifies ports of said each switch that can be used to transmit said connection request packets from said each switch to selected destination devices.

3. A method as recited in claim 2, wherein said table identifies each of said ports as being a send preference port or a receive preference port, or equivalently, identifies each corresponding cross link connected to a corresponding one of said ports as being a send preference cross link or a receive preference cross link relative to said each switch.

4. A method as recited in claim 1, wherein said connection request packets are routed according to entries in a table in each of said switches, with each entry indicating one or more corresponding ports, each of which is connected to one of said cross links with an assigned preferred direction, that can be used to send corresponding ones of said connection request packets to a corresponding destination.

5. A method as recited in claim 1, wherein end to end priority is assigned to one connection request packet of a pair of said connection request packets when both connection request packets of said pair of connection request packets are requesting transmission between any same pair of said plurality of devices, with said one connection request packet being forwarded from one of said cross links between a pair of adjacent switches of said system while another connection request packet of said pair of connection request packets will not be forwarded on any other of said cross links between said pair of adjacent switches until at least a connection through said one cross link, established for said one connection request packet is broken.

6. In a switching system having a plurality of dynamic switches interconnected by cross links, and having a plurality of devices connected to said system, with connections being established by transmitting connection request packets through said system, a method of eliminating livelock, and reducing the occurrence of race conditions created when two of said connection request packets are concurrently transmitted in different directions through any same cross link, of said plurality of cross links, said method comprising:
   a. initially assigning preferred directions to each of said cross links;
   b. routing each of said connection request packets in preferred directions on said cross links if preferred directions on said cross links are available;
   c. routing each of said connection request packets in non-preferred directions if a preferred direction on said cross links is unavailable; and
   d. transmitting a response packet in response to one connection request packet of said two connection request packets indicating that a connection identified in said one connection request packet can not be established, where said one connection request packet was transmitted over said one cross link in a non-preferred direction for said one cross link, where another of said two connection request packets was transmitted on said one cross link in the opposite direction as said one connection request packet and where said two connection request packets are from two different devices, of said devices, on two different ones of said switches and are not requesting connections between said two different devices.

7. In a switching system having a plurality of dynamic switches interconnected by cross links, and having a plurality of devices connected to said system, with connections being established by transmitting connection request packets through said system, an apparatus for eliminating livelock and reducing the occurrence of race conditions created when two of said connection request packets are concurrently transmitted in different directions through any same cross link, of said cross links, said apparatus comprising:

a. means for initially assigning preferred directions to each of said cross links;

b. means for routing each of said connection request packets in preferred directions on said cross links if preferred directions on said cross links are available;

c. means for routing each of said connection request packets in non-preferred directions if a preferred direction on said cross links is unavailable; and d. means for transmitting a response packet in response to one of said two connection request packets indicating that a connection identified in said one connection request packet can not be established, where said one connection request packet was transmitted over said same link in a non-preferred direction for said same link, where another of said two connection request packets was transmitted on said same link in the opposite direction as said one request packet, and where said two connection request packets are from two different devices on different ones of said switches and are not requesting connections between said two different devices.

8. In a switching system having a plurality of dynamic switches interconnected by cross links, and having a plurality of devices connected to said system, with connections being established by transmitting connection request packets through said system, a method of eliminating livelock, and reducing the occurrence of race conditions created when two of said connection request packets are concurrently transmitted in different directions through any same cross link, of said cross links, said method comprising:

a. initially assigning preferred directions to each of said cross links; and b. routing each of said connection request packets in preferred directions of said cross links if preferred directions on said cross links are available, wherein end to end priority is assigned to one connection request packet of a pair of said connection request packets when both connection request packets of said pair of connection request packets are requesting transmission between any one same pair of said plurality of devices, with said one connection request packet being forwarded from one of said cross links between a pair of adjacent switches of said system while another connection request packet of said pair of connection request packets will not be forwarded on any other of said cross links between said pair of adjacent switches until at least a connection through said one cross link, established for said one connection request packet, is broken.

9. A method as recited in claim 8, wherein each of said switches comprises a table, wherein said table in each of said switches identifies ports of said each switch that can be used to transmit said connection request packets from said each switch to selected destination devices.

10. A method as recited in claim 9, wherein said table identifies each of said ports as being a send preference port or a received preference port, or equivalently, identifies each corresponding cross link connected to a corresponding one of said ports as being a send preference cross link or a receive preference cross link relative to said each switch.

11. A method as recited in claim 10, wherein said connection request packets are routed according to entries in a table in each of said switches, with each entry indicating one or more corresponding ports, each of which is connected to one of said cross links with an assigned preferred direction, that can be used to send corresponding ones of said connection request packets to a corresponding destination.

* * * * *